Patented Feb. 22, 1938

2,108,893

UNITED STATES PATENT OFFICE 2,108,893

COMPOSITION OF MATTER AND METHOD OF MAKING THE SAME

Walter J. Koenig, Philadelphia, Pa., assignor to Sloane-Blabon Corporation, Philadelphia, Pa., a corporation of Delaware No Drawing. Application December 22, 1934, Serial No. 758,864

7 Claims. (Cl. 260—2)

This invention relates to a novel composition of matter to a novel method of making the same and to a novel method of drying oils and oleaginous compositions. More particularly, the invention relates to an oleaginous composition for coating, plastics and the like, especially adapted for use in the manufacture of floor covering materials, etc., and to resinous products derived from said oleaginous compositions and to novel methods by which the oleaginous compositions are reacted to form resinous products, and particularly to the method of drying such oleaginous compositions by resin-forming reactions.

This application is a continuation in part of my prior co-pending application Serial No. 646,148, filed September 7, 1932, entitled Composition of matter and method of making the same. In my said prior application, I have disclosed methods of drying oils by a resin-forming condensation and a number of compositions suitable for drying by said method and resulting from such drying. With similar objects in view to those set forth in my said prior application.

I have now discovered that several condensing agents may be made to react simultaneously or successively with the same oil, and that an improvement in quality likewise may be produced as compared with the products of condensing the oil and a single condensing reagent.

As will be apparent to those skilled in the art, there are infinite possibilities for multiple condensations embodying the present invention. And by applying the general principles of organic synthesis together with the principles and disclosures herein set forth, an infinite variety of such combinations may actually be produced.

Some advantages may be secured by producing simultaneously different condensation products within the same mass, and thus there may be advantage in using a plurality of condensing reagents, even though they may mutually exclude each other from the oil molecules with which they react; but in the present invention, I am particularly concerned with condensation products in which a plurality of condensing reagents are condensed with the oil into the same molecule; and I believe that the important practical advantages are due to the greater complexity of the condensed molecule resulting from the attaching to the oil molecule of two or more different molecules of the condensing reagents.

In many cases it is practicable to mix the several condensing reagents with the oil and to react them simultaneously. Where, however, one reagent has a tendency to condense with the oil molecule in such a way as to exclude further condensation with the other reagent, I prefer to react them successively, using first the reagent which is not exclusive. This successive procedure may also be preferable for other reasons, as, for example, when the condensing reactions are preferably carried on at different temperatures or under different conditions, or where one reacts with the oil so much more rapidly than the other that a satisfactory condensation of the latter cannot be attained before the oil is set up by the former.

With China-wood oil, almost any two of the condensing reagents disclosed in my prior applications Serial Nos. 646,148 and 646,149, filed September 7, 1932 now Patent Nos. 2,058,596 and 2,047,149 respectively, and in my co-pending applications Serial Nos. 758,859 to 758,863, inclusive, filed herewith may be used. Applications Serial Nos. 758,859 and 758,861 are now Patent Nos. 2,058,597 and 2,058,598.

In my co-pending application, cyclic organic compounds have been described as giving the best results in the condensation reaction between the treated oil and the condensing agent.

By cyclic organic compounds, I mean oxy-cyclic compounds which are true saturated and true unsaturated oxy-heterocyclic compounds in which the element is oxygen, and true oxy-carbocyclic compounds, having hydroxyl, keto, aldehyde or anhydride groups. Under cyclic organic compounds, I also include cyclic hydrocarbon terpenes.

By true saturated or true unsaturated oxy-heterocyclic and true oxy-carbocyclic compounds, I mean that the compounds consist of hydrogen and carbon atoms and the above-named oxy-groups. I include unsaturated unsubstituted heterocyclic compounds in which the element is oxygen, as such compounds will condense in accordance with my invention. It is understood that throughout the definitions supra, methyl groups, etc., are included since they include only carbon and hydrogen.

With oils having fewer reactive linkages, care should be taken to react the oil first with condensing reagents which combine with only one reactive linkage of the oil, or under conditions such that condensation is limited to one such reactive linkage.

For example, I may charge 90 parts by weight of China-wood oil, 10 parts by weight of phenol into a Bedford kettle and blow the mixture at about 170° to 200° F. until it forms a plastic solid when cooled.

Five parts of phthalic anhydride are added to the resulting composition, and the mixture heated to about 280° F., preferably without further blowing, until the desired body is attained.

Upon cooling, a tough sticky plastic is produced which dries rapidly and uniformly at super-atmospheric temperatures to a tough, permanently flexible material which is highly resistant to alkalies and to abrasive wear.

Fillers, pigments, resins, etc., may be added during and/or after the cook, as, for example, is well known, and is common practice in linoleum manufacture as carried out prior to my invention.

In case resins are added, I prefer to use synthetic resins as phenol formaldehyde or paracoumarone, instead of natural resins as rosin, etc.

Other oils, in which I include treated and untreated drying oils, treated semi-drying oils and non-drying oils, that possess double bonds in conjugate arrangement, e. g. —C=C—C=C—, or —C=C—C=C—C=C—, (such as China-wood oil, fish oils, oiticica oil, blown or properly oxidized linseed oil, blown or properly oxidized poppyseed bean oil, blown or properly oxidized poppyseed oil, etc., castor oil heated under reduced pressures to form conjugate double bond structure and esterified, blown or properly oxidized drying oil fatty acids, and the above treated and untreated oils, having the above double bond conjugate structure, blown with drying oil fatty acids or such oils to which blown or properly oxidized fatty acids have been added), fall within the scope of my invention. I prefer to use blown or properly oxidized oils, although the raw oils having the above described conjugate double bond arrangement will dry in accordance with my invention.

Maleic anhydride and other anhydrides having similar reactive linkages between C-atoms are, as set forth in my copending application Serial No. 758,859 filed herewith, especially desirable for condensation with the oil, but because the condensation with the oil leaves the anhydride structure free, the condensation tends to reduce the alkali resistance of the product. If, instead of the single condensation with the anhydride, a further condensation is effected with an oxy-compound, e. g., an alcohol, e. g., glycerol, a glycol, a hydroxy terpene, e. g., terpineol, ethylene glycol, or an ether such as anethol, which reacts with the anhydride structure, a product may be obtained which is much superior in alkali resistance.

As one example of this,

| | Parts by weight |
|---|---|
| 7" (Gardner-Holdt) blown China-wood oil | 400 |
| Maleic anhydride | 100 |
| Terpineol | 35 | may be charged together into a Walton kettle, heated to and held at a temperature of 280°–300° F. for 2½ hours. The resulting product is a plastic suitable for example for linoleum cement, and when dried for a few days in an ordinary linoleum heater it forms an excellent, tough, pliable resin.

A Bedford kettle may be used instead of a Walton kettle, and if the mixture is blown, raw oil may be used with as good results as the blown oil, and linseed oil with almost as good results as China-wood oil. Thus, for example,

| | Parts |
|---|---|
| Linseed oil | 200 |
| China-wood oil | 550 |
| Maleic anhydride | 225 |
| Glycerine | 215 | may be charged together into a Bedford kettle and blown at 230° F. to the desired viscosity.

Either bodied or raw oils may be used in this case and if preferred, the oils may be blown to any extent up to gellation before the maleic anhydride and glycerine are added, and ordinary linoleum practice may be followed by blowing to gellation in a Bedford kettle, cooling and remelting with the condensing reagents in a Walton kettle at 280° F.

Other oils, as suggested above, may be used, resins, fillers, etc., may be added, and the example may be varied in other ways, e. g., as already suggested in connection with the phthalic and phenol condensations.

The example given above is intended primarily for plastics, for thinner varnishes and vehicles. I prefer α-terpineol or anethol, since it is difficult to keep the glycerine from rising to the surface in the lighter bodied oils.

It will already have been appreciated by those skilled in the art that a feature of primary importance of the present invention is that the reactions herein disclosed are capable of drying the oils in films without objectionable distortion whether the oil is extended upon a surface of large area or as an adhesive film on particles of a plastic composition. It constitutes, therefore, not only a method of obtaining novel resinous compositions, but even more important, a method of drying oils by converting them into such resinous products, directly, and after they have been given their form as finally desired.

It is of primary importance, moreover, that according to the present invention, the reaction can be initiated en masse and then interrupted at a point short of complete drying. Thus, the more costly final step of heating the finished article can be reduced to a very short treatment.

In so far as this application relates to the condensation of cyclic anhydrides with oils, it is within the broad scope of my co-pending application Serial No. 758,859 filed herewith.

In the examples given above, I have specified particularly plastics and printing inks, since the invention gives very great advantages in those fields. It is to be understood, however, that my invention is of much wider application than the particular examples mentioned above and may be applied generally to all sorts of protective and decorative coatings and molded or machine resinous products, including paints, enamels, varnishes and plastics such as would be used in floor coverings and the like, printing ink, lithograph varnishes, coatings for tin cans, etc., coating impregnating and insulating varnishes, protective coatings for automobiles, machinery, furniture and other articles, and plastic for electrical insulation, chemically resistant articles, household utensils, decorative objects, implements, handles, etc., to mention only a few of the numerous applications of my invention.

In addition to the formation of the above type of condensation product, it is possible to produce another type whereby the two condensing agents will react separately, at super-atmospheric temperatures at different double bonds of the oil. Thus, mono-nuclear saturated true oxy-cyclic compounds, that will not react with each other under conditions specified, but that will separately condense with the oil, will react, in proportions depending upon affinities, at different double bonds of the oil. As an example of this, cyclohexanone and cyclohexanol will not react with each other under the conditions specified in the examples given above, but each will condense with the oil molecule at different double bonds of the oil under the conditions specified. The same is true of ary-alpha-keto-tetrahydronaphthalene and phenol. In fact, any mono-nuclear saturated true oxy-cyclic compound, as disclosed in my co-pending application 646,148, will react similarly under conditions described above. Likewise this is true of phloroglucinol and resorcinol.

In either case, i. e., (A), where the condensation product of the oil and condensing agent reacts further with another condensing agent at the remaining reactive structure of the first condensing agent, or (B), where the two condensing agents will not react with each other under the conditions specified, but will separately condense with the oil at different points of unsaturation in the oil molecule, a highly complex molecule will result as a final product which greatly increases the alkali resistance, flexibility, durability, appearance, etc., of the resulting resinous product. These features are especially desirable when the sheeted product is used as a linoleum or similar material.

It seems clear that a condensation occurs. The extent of condensation depends on the condensing agents used, but regardless whether the condensation is partial or practically complete, the reaction falls within the scope of this invention, since my invention embraces rapid drying action at super-atmospheric temperatures in substantially non-oxidizing atmospheres, as due to the condensation. In the case of partial condensation, i. e., where the amount of condensing agent is less than in stoichometric relations, it is my theory that the presence of the particular type of condensation product of the oil and condensing agents is responsible for the rapid drying. The invention described herein cannot be construed in the same light as the action of driers, as the action proceeds unimpeded or rapidly, as the case may be, in substantially non-oxidizing atmospheres at super-atmospheric temperatures with definite favorable results starting as low as 120° F., which, in addition, differentiates from polymerization and oxidation under similar conditions.

If more than one condensing agent is used, it is not necessary to add the several condensing agents as a mixture at the start of the reaction. The reaction may be started with a single condensing agent, and after the reaction has progressed to any point before becoming a solid mass, the reaction may be retarded by merely cooling the mixture. Additional condensing agent may then be added, if desired, and the reaction accelerated again by merely raising the temperature. The addition of more than one condensing agent tends to create final products having more complex structures, thereby creating a tougher film in the final product. It is understood that the reaction may be retarded and accelerated any number of times before completion, and, if desired, additional condensing agent may be added which enter the condensation reaction. If desired, an additional quantity of the original condensing agent or a mixture of the original and a different type of condensing agent may be added. It is within the scope of this invention to include the addition of an additional quantity of the same condensing agent used at the start of the reaction and/or a different one at any point in the reaction. The feature of accelerating and retarding the reaction at any desired point in the reaction is a very desirable point, and is accomplished by merely controlling the temperature. It is not necessary to add additional condensing agents to again accelerate the reaction after it has been retarded, although this may be done if so desired, as explained above.

In the above specification, I have given examples and suggested certain modifications for the purpose of illustrating the invention without in any way attempting to exhaustively cover all of the various modifications and applications of my invention. Similarly, I have expressed certain theories which I have developed in the course of my investigations and practical experience with this invention, which, I believe, may be helpful to those who subsequently apply and extend the application of my invention. However, I have not as yet tested these theories sufficiently to set them up as certainly correct, and since the invention is in no way dependent upon the correctness of any theories which I have expressed, it is to be understood that the scope of my invention and of this application is not to be limited thereby.

I have used the term "condensation" herein broadly to mean the union of two or more organic substances with or without the elimination of component elements.

What I claim is:

1. The method of hardening drying oil which comprises condensing a mixture at super-atmospheric temperature in which the condensation reactants consist of oxidized drying oil having double bonds in conjugate arrangement and a plurality of different cyclic organic compounds, said oil condensing with one of the cyclic organic compounds to form a condensation product, then adding a different cyclic organic compound and condensing the condensation product with the added cyclic organic compound, thereby producing a complex molecule and a tough durable mass.

2. The method of hardening drying oil as described in claim 1, in which a synthetic resin is present in the mixture during the condensation reaction.

3. The method of hardening drying oil as described in claim 1, in which the first cyclic organic compound to condense with the oil is maleic anhydride, and the second organic compound to condense is terpineol.

4. The method of hardening drying oil as described in claim 1, in which the one cyclic organic compound to condense with the oxidized oil is phthalic anhydride, and the second cyclic organic compound is a phenol.

5. The method of hardening drying oil which comprises condensing a mixture at super-atmospheric temperature in which the condensation reactants consist of oxidized drying oil having double bonds in conjugate arrangement and a plurality of different cyclic organic compounds, said oil condensing with one of the cyclic organic compounds to form a condensation product, then adding a different cyclic organic compound and condensing the condensation product with the added cyclic organic compound until the desired viscosity is obtained, cooling the condensed mixture and shaping the cooled condensed mixture into a desired useful product, finally hardening the shaped product at super-atmospheric temperature.

6. The method of hardening drying oil as described in claim 5 in which the final hardening is carried on in an atmosphere substantially devoid of oxygen.

7. The method of hardening drying oil as described in claim 5 in which the final hardening occurs in a substantial atmosphere of non-oxidizing gases given off by the shaped product.

WALTER J. KOENIG.